(12) United States Patent
Wushour

(10) Patent No.: US 11,467,786 B2
(45) Date of Patent: Oct. 11, 2022

(54) USING ARTIFICIAL INTELLIGENCE TO RESPOND TO PRINTER ERROR

(71) Applicant: KYOCERA Document Solutions Inc., Osaka (JP)

(72) Inventor: Dilinur Wushour, Clayton, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 86 days.

(21) Appl. No.: 17/165,232

(22) Filed: Feb. 2, 2021

(65) Prior Publication Data

US 2022/0244892 A1 Aug. 4, 2022

(51) Int. Cl.
*G06F 3/12* (2006.01)

(52) U.S. Cl.
CPC .............. *G06F 3/121* (2013.01); *G06F 3/123* (2013.01); *G06F 3/1234* (2013.01)

(58) Field of Classification Search
None
See application file for complete search history.

(56) References Cited

U.S. PATENT DOCUMENTS

| 6,295,423 | B1 | 9/2001 | Haines et al. | |
|---|---|---|---|---|
| 6,564,227 | B2 | 5/2003 | Sakakibara et al. | |
| 7,245,838 | B2 | 7/2007 | Swift | |
| 2017/0123736 | A1* | 5/2017 | Park | G06F 3/1234 |
| 2019/0306327 | A1 | 10/2019 | Matysiak et al. | |
| 2020/0257586 | A1* | 8/2020 | Kobayashi | G06N 20/00 |

* cited by examiner

*Primary Examiner* — Eric A. Rust
(74) *Attorney, Agent, or Firm* — W. Eric Webostad

(57) ABSTRACT

Systems and methods relate generally to responding to a system error of a printing device. In an example method thereof, an error code is generated by the printing device in response to the system error and reported to a backend application in a Cloud-based system. The backend application includes an artificial intelligence engine for performing operations. The artificial intelligence engine analyzes the error code and obtains source code for the printing device. The artificial intelligence engine upgrades the source code for a solution to the error code and generates binary code from the upgraded source code. The artificial intelligence engine loads a virtual machine with the binary code. The artificial intelligence engine simulates operation using the virtual machine with the binary code. The artificial intelligence engine evaluates operation of the virtual machine with the binary code. The virtual machine simulates operation of an internal engine of the printing device.

20 Claims, 7 Drawing Sheets

USING ARTIFICIAL INTELLIGENCE TO RESPOND TO PRINTER ERROR

FIELD

The following description relates to printing devices. More particularly, the following description relates to AI-assisted response to a system error of a printing device.

BACKGROUND

Conventionally, a printing device may generate an error code. Such a printing device may display information regarding such an error code, leaving dealing with such an error code to human intervention.

SUMMARY

In accordance with one or more below described examples, a method relating generally to responding to a system error of a printing device is disclosed. In such a method, an error code is generated by the printing device in response to the system error. The error code associated with printing device is reported to a backend application in a Cloud-based system. The backend application includes an artificial intelligence engine for performing operations. The artificial intelligence engine analyzes the error code. The artificial intelligence engine checks a knowledge base for a solution to respond to the error code. The artificial intelligence engine finds the solution in the knowledge base including binary code therefor. The artificial intelligence engine loads a virtual machine with the binary code. The artificial intelligence engine simulates operation using the virtual machine with the binary code. The artificial intelligence engine evaluates operation of the virtual machine with the binary code. The virtual machine simulates operation of an internal engine of the printing device.

In accordance with one or more below described examples, another method relating generally to responding to a system error of a printing device is disclosed. In such a method, an error code is generated by the printing device in response to the system error. The error code associated with printing device is reported to a backend application in a Cloud-based system. The backend application includes an artificial intelligence engine for performing operations. The artificial intelligence engine analyzes the error code. The artificial intelligence engine obtains source code for the printing device. The artificial intelligence engine upgrades the source code for a solution to the error code. The artificial intelligence engine generates binary code from the upgraded source code. The artificial intelligence engine loads a virtual machine with the binary code. The artificial intelligence engine simulates operation using the virtual machine with the binary code. The artificial intelligence engine evaluates operation of the virtual machine with the binary code. The virtual machine simulates operation of an internal engine of the printing device.

In accordance with one or more below described examples, yet another method relating generally to responding to a system error of a printing device is disclosed. In such a method, an error code is generated by the printing device in response to the system error. The error code associated with printing device is reported to a backend application in a Cloud-based system. The backend application includes an artificial intelligence engine for performing operations. The artificial intelligence engine analyzes the error code. The artificial intelligence engine obtains source code for the printing device. The artificial intelligence engine upgrades the source code for a solution to the error code. The artificial intelligence engine generates binary code from the upgraded source code. The artificial intelligence engine loads a simulator with the binary code. The artificial intelligence engine simulates operation using the simulator with the binary code. The artificial intelligence engine evaluates operation of the simulator with the binary code. The simulator simulates operation of an operating system of the printing device.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

DETAILED DESCRIPTION

Figure 1:
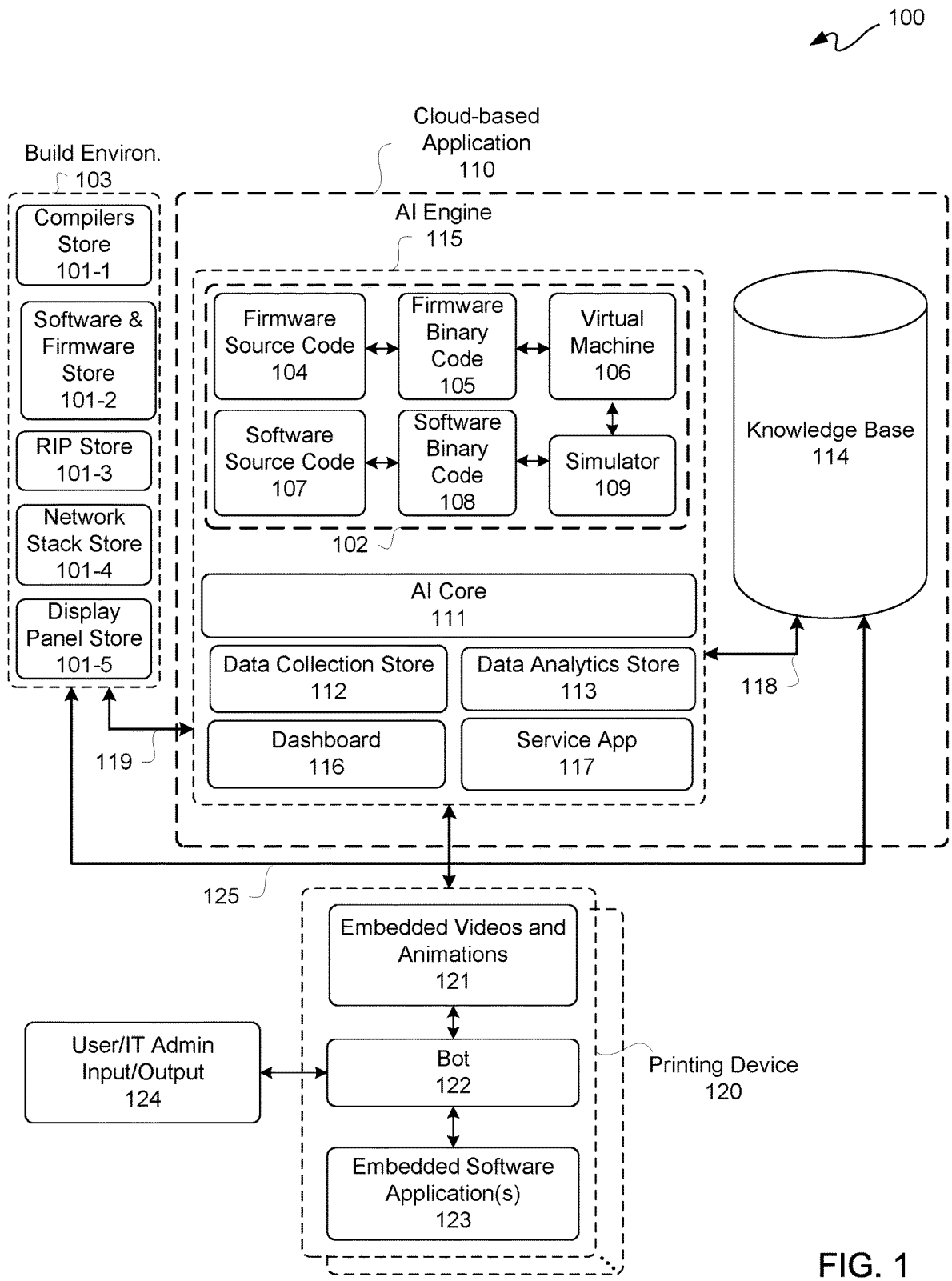
FIG. 1 is a block-flow diagram depicting an example of an AI-assistance system.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

As previously indicated, a printing device may generate an error code in response to a system error. As described below, an artificial intelligence-assistance ("AI-assistance") system having an Cloud-based application with an AI engine and a knowledge base is used to respond to such a system error, to aid a user, technician, service person, information technology ("IT") admin, or other person for providing a resolution to such system error.

With the above general understanding borne in mind, various configurations for systems, and methods therefor, with capabilities for responding to a system error of a printing device are generally described below.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object-oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also, two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule-based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

FIG. 1 is a block-flow diagram depicting an example of an AI-assistance system 100. AI-assistance system 100 may be configured for troubleshooting and/or maintenance of an information handling system. The example of a printing device for an information handling system is used for purposes of clarity and not limitation for a response to a system error. However, other types of information handling systems may benefit from technology described herein, including for example scanners and other devices which may rely upon backend support via a network. This allows such client devices to have less resources in order to reduce costs. AI-assistance system 100 in this example is configured as a Cloud-based application 110; however, in another example, AI-assistance system 100 may be configured as another type of backend network application.

Cloud-based application 110 includes an Artificial Intelligence ("AI") engine 115. For purposes of clarity and not limitation, AI engine 115 is referred to as an Artificial Intelligence/Machine Learning-assistance ("AI/ML-assistance") engine 115, which is coupled for communication with a knowledge base or knowledge base 114. In another configuration, Cloud-based application 110 may further include a build environment 103; however, in this example, build environment 103 is depicted as a separate component with respect to Cloud-based application 110.

In this example, AI/ML-assistance engine 115 includes in part firmware source code 104, software source code 107, firmware binary code 105, software binary code 108, a virtual machine 106, and a simulator 109. Each component of AI/ML-assistance engine 115 may communicate with at least one other component of such engine, either unidirectionally or bidirectionally. All of these communication paths are not depicted herein for purposes of clarity and not limitation. However, communication between closely related components is depicted for purposes of clarity, and functional relationships between components are described, and such functional relationships may indicate communicational relationships.

Along those lines, firmware binary code 105 may be a binary representation of firmware source code 104. Firmware source code 104 may be compiled to provide firmware binary code 105, and in reverse firmware binary code 105 may be decompiled to provide firmware source code 104.

Likewise, software binary code 108 may be a binary representation of software source code 107. Software source code 107 may be compiled to provide software binary code 108, and in reverse software binary code 108 may be decompiled to provide software source code 107.

Virtual machine 106 may virtually operate so as to simulate an internal engine of a printing device having firmware binary code 105. During such operation, virtual machine 106 loaded with binary code may be in bidirectional communication with firmware binary code 105 to upgrade, such as to swap code in and/or out. In this example, when loaded with binary code, virtual machine 106 may function like a multi-function printer engine of a multi-function printer associated with an error code being processed.

Simulator 109, which in this example is for a printing device, may virtually operate so as to simulate a printing device using software binary code 108. During such operation, simulator 109 may be in bidirectional communication with software binary code 108 to upgrade. In this example, when loaded with binary code, simulator 109 may function like a software running on a multi-function printer associated with an error code being processed.

AI/ML-assistance engine 115 components, which may as in this example include components with reference numbers 104 through 109 as described below in additional detail, are collectively referred to as updater 102. Updater 102 may be used for testing and updating firmware and/or software, as described below in additional detail. Even though a machine language, such as binary code is described, other machine or computer languages may be used for operation of a virtual machine and/or a simulator in other examples of updater 102.

Furthermore, even though a printer, or more particularly a multi-function printer ("MFP"), is described below as an example for a printing device 120, the following description is applicable to other types of printing devices. Continuing the example of an MFP for a printing device 120, virtual machine and simulator are hereinafter respectively referred to as MFP virtual machine 106 and MFP simulator 109 for purposes of clarity and not limitation. Likewise, a printing device is herein referred to as MFP 120 for purposes of clarity and not limitation.

Generally, AI is for decision making, and ML, which may be considered a subset of AI, allows a system to learn new things from data. Furthermore, Deep Learning, which may be a subset of ML, may be used to refer to learning from large data sets. AI and ML are parsed here for purposes of clarity and not limitation.

In this example, AI/ML-assistance engine 115 further includes in part an AI core 111 for making decisions and learning. AI core 111 may be a chip, such as from Nvidia, Intel, Amazon, Google, Microsoft, or another AI chip designer. Furthermore, AI core 111 may be a service, such as for example a SaaS, provided from Amazon. For purposes of clarity, AI core 111 is hereinafter referred to as AI/ML decision-learning core 111, and generally described as a chip implementation, for purposes of clarity by way of example and not limitation. AI/ML decision-learning core 111 may be configured for intelligent learning for purposes of troubleshooting and maintenance of an MFP 120, as well as expansion of and improvement to knowledge base 114. Along those lines, AI/ML decision-learning core 111, as well as one or more other components of AI/ML-assistance engine 115, may be in communication with one or more knowledge bases, generally represented as knowledge base 114.

Knowledge base 114 may include knowledge from manuals, technician service calls and outcomes therefrom, engineering schematics, and/or other resources associated with internal workings of one or more MFPs, including MFP 120. Along those lines, knowledge base 114 may include diagnostics, troubleshooting procedures, resolutions, automated procedures, regression tests, and/or other information regarding one or more MFPs.

In this example, AI/ML-assistance engine 115 yet further includes in part a data collection store 112, data analytics store 113, a dashboard 116, and a service app 117. Data collection store 112 and data analytics store 113 may respectively be in communication with AI/ML decision-learning core 111 for respective storing collected data and generated analytic data. Dashboard 116 may be used to provide a user-interface ("UI") for AI/ML-assistance engine 115. Service app 117 may be configured to receive, analyze and classify error codes and network traces from or associated with MFP 120.

AI/ML-assistance engine 115 may be in point-to-point or other direct communication with each of knowledge base 114 and build environment 103, as generally indicated by signal busses or arrows 118 and 119, respectively. Build environment 103 is a generalized representation of resources available to AI/ML-assistance engine 115. Such resources may include firmware and software compilers and decompilers ("compilers") store 101-1, software and firmware store 101-2, raster image processors ("RIP") store 101-3, network stacks store 101-4, printing device panels store 101-5, and/or other build resources. RIP store 101-3 may include firmware RIPs for each printing device 120 supported. Along those lines, RIP store 101-3 may further include virtual machines and simulators for virtual operation of firmware and software, respectively, for each printing device 120 supported.

AI/ML-assistance engine 115, build environment 103, and knowledge base 114 may be in bussed communication with MFP 120 as generally indicated by signal busses or arrows 125. MFP 120 may include embedded videos or animations 121 for purposes of instruction in operation, maintenance and troubleshooting of MFP 120. MFP 120 may further include a bot 122, such as a chat bot or virtual assistant. MFP may yet further include embedded software application(s) 123.

Bot 122 may be in communication with each of embedded videos and animations 121, as well as with embedded software application(s) 123. Bot 122 may further be in communication with user or information technology ("IT") administrator input/output 124.

AI-assistance system 100 may be used for troubleshooting, maintenance, AI-assisted troubleshooting, AI-assisted maintenance, AI-assisted programming, AI-assisted learning, automated testing, and/or remote maintenance. Along those lines, some task which have traditionally be performed by humans, may be performed in whole or in part by AI-assistance system 100. While use of AI-assistance system 100 may reduce labor costs with respect to printing device maintenance, troubleshooting, and repair, AI-assistance system 100 may further reduce time and frustration in dealing with a printing device with whom a user, a service technician, or IT administrator has little to no expertise. For example, AI-driven capabilities and solutions can assist a service person to analyze a failure, and then troubleshoot and resolve any issue or issues related to such failure via automated procedures. Furthermore, a service person for example may be assisted in conducting routine maintenance, including software and/or firmware upgrades. AI-augmented analytics, testing, code generation, and solution development may speed up technical service processes and empower service personnel.

Cloud-based application 110 may be connected to one or more printing devices 120 of same or different types. Along those lines, one or more printing devices 120 of same or different types may be registered to a single Cloud-based application 110. For purposes of clarity by way of example and not limitation, Cloud-based application 110 may be thought of as an AI-driven/directed smart app to assist or replace service personnel to maintain one or more printing devices 120 remotely.

Cloud-based application 110 may periodically collect data from each registered printing device 120 and analyzing such collected data determine status of each such registered printing device. Such status may be used for example in determining whether routine maintenance is to be performed. Furthermore, Cloud-based application 110 may generate a dashboard 116 to display on a display panel for a printing device, which display panel configuration may be obtained from display panels store 101-5. Such a dashboard 116 may display overall status, such as for example toner/ink levels, print/scan counts, scheduled maintenance, failure history, engine lifetime, drum lifetime, and/or other status information.

Cloud-based application 110, or more particularly AI/ML-assistance engine 115 thereof, may access each printing device's latest firmware and software in both binary and source code from a software and firmware store 101-2 for use in updater 102. Cloud-based application 110, or more particularly AI/ML-assistance engine 115 thereof, may access each printing device's latest virtual machine and simulator from RIP store 101-3 for use in updater 102. Compilers and decompilers may be accessed from compilers store 101-1 for compiling or decompiling code for purposes of generation and testing of patches, repairs, and/or upgrades of software and/or firmware.

Cloud-based application 110, or more particularly knowledge base 114 thereof, may contain each printing device's automated procedures for troubleshooting, collaborating, maintaining, software upgrading, and/or firmware upgrading, among other printing device procedural information. During operation of AI/ML decision-learning core 111, acquired data and data analytics generated therefrom may be respective stored in data collection store 112 and data analytics store 113.

Network stack store 101-4 may include networking information of each registered printing device. Such networking information may be used for associating a printing device with a network trace and logging information. Generally, a network trace may be used to connect a machine to a network and monitor data traffic. Trace tools can convert and open each packet and identify a protocol used, an IP address of a source and destination, and other path and payload information.

Figure 2:
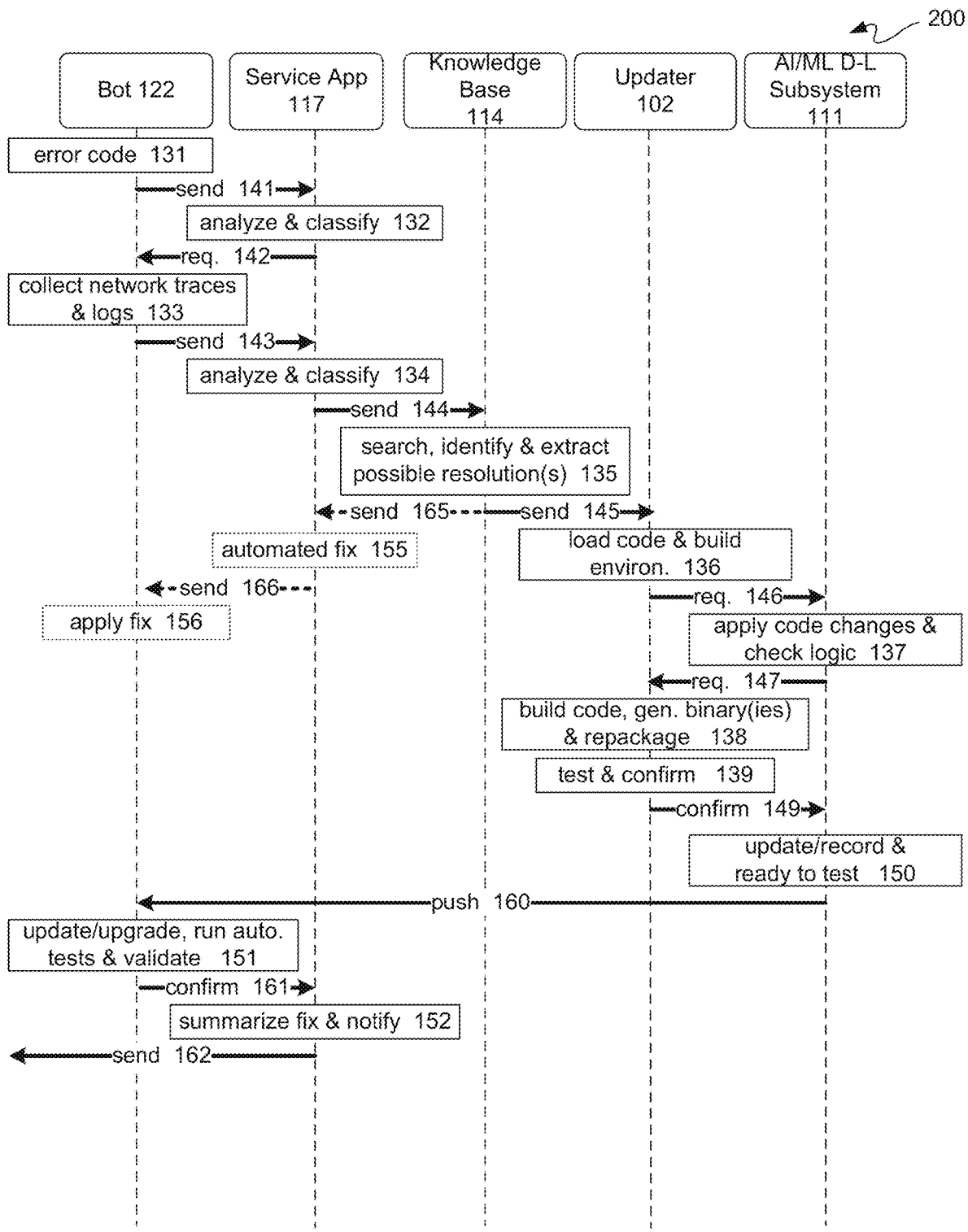
FIG. 2 is a block-flow diagram depicting an example of an AI-assistance system flow.

FIG. 2 is a block-flow diagram depicting an example of an AI-assistance system flow 200. AI-assistance system flow 200 is just an example of a use case; however, other use cases follow from the description herein. AI-assistance system flow 200 is further described with simultaneous reference to FIGS. 1 and 2.

In this example, a bot 122 receives or otherwise obtains at least one error code 131 generated by an MFP 120 continuing the above example. This error may be for a printing function, a scanning function, or other function of MFP 120. For purposes of clarity by way of example and not limitation, a printing function error is assumed, though the following description equally applies to other types of errors.

At 141, such at least one error code 131 may be sent from MFP 120, such as by bot 122, to a service app 117 of a Cloud-based application 110, or more particularly AI/ML-assistance engine 115 thereof, for processing.

Along those lines, upon receiving a failure or error code from an MFP 120, Cloud-based application 110, or more particularly service app 117, automatically collects network trace and log information by sending a service request 142 for additional information and starts analyzing and classifying data obtained from such error code at operation 132. In response to service request 142, bot 122 collects network traces and log information at operation 133, and sends at operation 143 such collected network traces and log information to service app 117 for analysis and classification at operation 134.

After initial analysis for diagnostics and classification, service app 117 may send at operation 144 such diagnostic and classification information to knowledge base 114. Knowledge base 114 may be configured to use such received information as search vectors for searching for one or more possible solutions in one or more databases of knowledge base 114. Along those lines, knowledge base 114 may search for, identify, and extract one or more possible resolutions or solutions at operation 135.

Generally, knowledge base 114 is a database to store solution and resolution information; however, knowledge base 114 is configured to be expanded and updated through collecting data and data analytics developed through AI and MO by AI/ML decision-learning core 111. In an example, a solution may be obtained at operation 135, and information for such solution may be sent at operation 165 and applied via automated procedures/fixes configured in service app 117 at operation 155. Along those lines, an automatic remote fixing of an MFP may include a service app 117 remotely: applying a solution/fix at operation 156 by through bot 122 (or directly) in response to a service send operation 156 to an MFP 120. Application of such a fix may cause a rebooting of such MFP 120, a reestablishment of a network connection with such MFP 120, and an execution of diagnostics on such MFP 120 to confirm correction of an issue.

However, in some instances, a firmware and/or software update or upgrade may be used to resolve a problem. In such instances as in this example, information obtained at operation 135 by knowledge base 114 may be sent at operation 145 as part of an update/upgrade request of AI/ML-assistance engine 115 to update or upgrade to firmware and/or software of an MFP 120. More particularly, updater 102 in response to receiving an update/upgrade request, at operation 136 updater 102 may automatically load code for an MFP 120 and build environment components for making changes to software and/or firmware, building such changes into an update or upgrade, and packaging or repackaging such a build for a software and/or firmware installation in such an MFP 120.

Updater 102 may at operation 146 send a request for a code change to AI/ML decision-learning core 111. AI/ML decision-learning core 111 may be implemented in hardware, software, or a combination thereof, though configured to determine and apply code changes at operation 137 to code loaded by updater 102 at operation 136. AI/ML decision-learning core 111 may check logic of such changed code as part of operation 137. After checking logic of changed code, AI/ML decision-learning core 111 may send a request at operation 147 for updater 102 to build and test such changed or revised code.

At operation 138, updater 102 may build source code for such changed code, generate one or more binaries therefor, and repackage such binaries for fixing an MFP 120. For a firmware example, firmware source code to be updated may have been loaded at operation 136 to provide firmware source code 104. A request sent at operation 147 may include source code to be appended or otherwise included in firmware source code 104, and updater 102 may build such updated source code with such received code, such as a patch for example. A compiler loaded, at operation 136, may compile such updated firmware source code 104 into firmware binary code 105. Before deploying such firmware build to an MFP 120, firmware binary code 105 may be executed on virtual machine 106 to conduct regression tests. This testing performed at operation 139 may be used to confirm at such operation that a firmware source code update passes tests to indicate same is ready for deployment.

For a software example, software source code to be updated may have been loaded at operation 136 to provide software source code 107. A request sent at operation 147 may include source code to be appended or otherwise included in software source code 107, and updater 103 may build such updated source code with such received code, such as a patch for example. A compiler loaded, at operation 136, may compile such updated software source code 107 into software binary code 108. Before deploying such software build to an MFP 120, software binary code 108 may be executed on simulator 109 to conduct regression tests. This testing performed at operation 139 may be used to confirm at such operation that a software source code update passes tests to indicate same is ready for deployment.

Additionally, virtual machine 106 may be operated in tandem with simulator 109, where virtual machine 106 and simulator 109 may communicate with one another to operate as a single printing device, such as an MFP 120. Virtual machine 106 for this example may be a virtual MFP engine, and simulator 109 may be a simulation of software operating on an MFP platform with such a virtual MFP engine instanced therein.

Assuming testing at operation 139 confirms updated code is ready for deployment, at operation 149 a confirmation of such success may be sent to AI/ML decision-learning core 111. If testing indicated a failure, such an indication may likewise be sent to AI/ML decision-learning core 111, and AI/ML decision-learning core 111 may then repeat operation 137 as part of AI/ML activities to make decisions and learn for a smart system.

For a confirmation of success received by AI/ML decision-learning core 111, at operation 150 AI/ML decision-learning core 111 may update, add a record, or otherwise record a latest version or versions of software and/or firmware for an MFP 120, such as in software and firmware store 101-2. At operation 150 a ready to test with actual MFP 120 message, including updated code, may be generated, and such message may be pushed at operation 160 to such an MFP, such as to bot 122 for example.

AI/ML decision-learning core 111 may remotely upgrade or update an MFP 120 with such newly generated software and/or firmware code using bot 122 at operation 151. Operation 151 may include some same operations as applying a fix at operation 156. For example, after loading, such as updating or upgrading, firmware and/or software code at operation 151, MFP 120 may be rebooted and then automated regressions tests may be run remotely at operation 151 to validate MFP is operating normally or properly. A ready screen may be displayed on a display panel of MFP 120, and a confirmation may be sent at operation 161, such as from bot 122 or otherwise from MFP 120, to service app 117 to confirm resolution and close an open trouble ticket associated with an error code sent at operation 141.

During an error state at operation/error code 131, an IT admin or user may be sent via message/email a notice of an interruption in service as part of user/IT admin input/output 124. Further at operation 131, a display panel on an MFP 120 may display "Under Maintenance/Repair" or similar message on so a user does not attempt to interrupt AI-assistance system flow 200. Once everything is back to normal, a notification generated at operation 152 may summarize a fix, and such notification may be sent at operation 162 to an IT admin or user as part of user/IT admin input/output 124. Optionally, an update or new record There are other examples of an AI-assistance system flow. For example, if a knowledge base 114 does not have a fix and instruction, a service person may implement/conduct a fix, and an AI of Cloud-based application 110 may record such procedure and added such fix into knowledge base 114. As knowledge base 114 is located in a Cloud-based network, service teams in different regional locations may utilize such knowledge, as well as contribute to the expansion of knowledge base 114. An AI of Cloud-based application 110 may localize knowledge base 114 and display an appropriate language on a display panel of MFP 120, including sending a notification in a local language.

Figure 3:
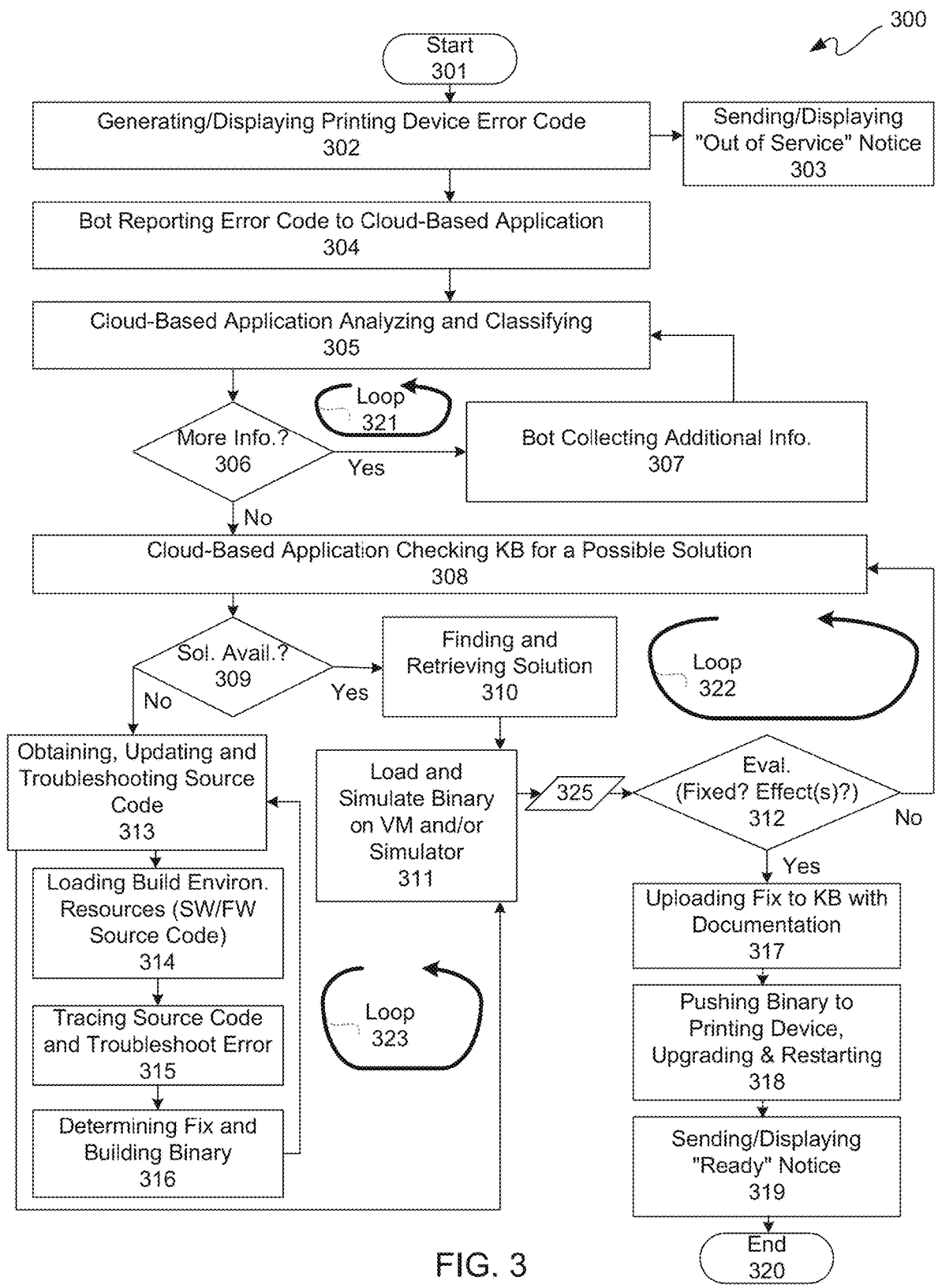
FIG. 3 is a flow diagram depicting an example of a Cloud-based AI application flow.

FIG. 3 is a flow diagram depicting an example of a Cloud-based application flow 300. With simultaneous reference to FIGS. 1 through 3, Cloud-based application flow 300 is further described.

Cloud-based application flow 300 may be started in background at 301, such as at power-up of a printing device, for monitoring such a printing device and for subsequent access by a bot of such printing device. At 302, a printing device may generate an error code in response to a system error thereof. At 302, such printing device may optionally display such an error code along with a brief description. Optionally, at 303 a notification of such an error code may be set to a user or IT admin about any and all issues associated with such error code. Optionally, at 303 an "Out of Service" notice may be displayed on such printing device.

At 304, a printing device may report an error code generated at 302 along with configuration data associated with such printing device to a backend application in a network, such as Cloud-based application 110 in a Cloud-based system of a network. In this example, a bot 122 of a printing device reports such error code and configuration data; however, in another application a virtual assistant or other reporter may be used. Furthermore, for Cloud-based application 110 monitoring such a printing device, Cloud-based application 110 may detect assertion of such an error code with or without reporting by bot 122.

At 305, a backend application, such as for example Cloud-based application 110, includes an AI engine 115 for analyzing and classifying such an error code and related configuration data. At 306, AI engine 115 of Cloud-based application 110 may determine whether more information is to be obtained for processing such an error code. If at 306 it is determined that more information is to be obtained, a request may be sent at 306 to have more information collected, such as for example by bot 122. At 307, more information, such as network trace and log data for example, may be obtained and sent by bot 122 to AI engine 115 of Cloud-based application 110 for analyzing and classifying at 305. Analysis loop 321 may execute for one or more cycles to gather information, as gathering of some information may lead to inquires about other information.

If, at 306, it is determined that no more information is to be obtained, then at 308, AI engine 115 of Cloud-based application 110 may check a knowledge base 114 for at least one possible solution being available to respond to such an error code. If at 309 it is determined that a possible solution or solution space is available, such as a "hot fix," a firmware update, and/or a software update, such solution may be found and retrieved from knowledge base 114 into AI engine 115, including AI/ML decision-learning core ("AI core") 111 thereof, of Cloud-based application 110 at 310.

At 311, a virtual machine 106 and/or a simulator 109 may be loaded with binary code respectively therefor and used for simulating operations by AI engine 115. A solution retrieved at 310 may include binary code. Binary code for firmware and/or software may be obtained from such solution, and directly loaded and simulated at operation 311 by AI engine 115.

At 311, AI engine 115 of Cloud-based application 110 may simulate operation using a virtual machine 106 loaded with firmware binary code for testing, as previously described. Moreover, at 311, AI engine 115 of Cloud-based application 110 may simulate operation using a simulator loaded with software binary code for testing, as previously described. Again, virtual machine 106 simulates operation of an internal engine of a printing device with firmware binary code, and simulator 109 simulates operation of a printing device with software binary code. For a printing device an MFP, virtual machine 106 is for an internal MFP engine of such MFP, and simulator is for an MFP operating system for simulating operation thereof.

At 311, such simulation may include both operation and operation under testing, such as regression testing for example as previously described, to produce a simulation result 325. Evaluation of such simulation result 325 may be performed at 312.

At 312, a determination may be made by AI engine 115 as to whether a simulation result 325 based on a hot fix, a firmware binary code update, and/or a software binary code update resolved or fixed a problem indicated by an error code generated at 302. Additionally, at 312 it may be determined by AI engine 115 whether such resolution or fix introduced any one or more side effects. If, at 312, it is determined that either a solution did not resolve a problem or introduced one or more side effects, then Cloud-based application flow 300 returns to operation 308 as part of evaluation loop 322. Evaluation loop 322 may cycle until a solution fixes a problem and produces no side effect.

If, at 312, it is determined by AI engine 115 that a solution did resolve a problem and introduced no side effect, then AI engine 115 may at 317 upload such a fix, including firmware and/or software binary code to knowledge base 114. Such upload may include documentation, including such an error code, associated with such resolution.

At 318, binary code used for a fix may be pushed by AI engine 115 to a printing device, and such printing device may be upgraded with such fix and restarted, as previously described. At 319, a "ready" or similar notice may be sent and/or displayed, as previously described, and, at 320, Cloud-based application flow 300 may end.

However, if at 309 it is determined by AI engine 115 of Cloud-based application 110 that no solution is available, then at 313 source code for a printing device may be obtained by AI engine 115 for updating and troubleshooting by AI engine 115. Such source code may be obtained from software and firmware store 101-2, as previously described. Operations at 313 may include operations at 314 through 316, inclusive.

At 314, resources from build environment 103 may be loaded by AI engine 115 of Cloud-based application 110, including loading of firmware and/or software source code for updating or upgrading. At 315, AI engine 115, including AI core 111 thereof, of Cloud-based application 110 may trace such source code and troubleshoot one or more issues associated with an error code generated at 302.

AI core 111 of AI engine 111 may be configured for tracing and troubleshooting at 315, as well as determining and implementing at 316 a fix to such source code. Such a fix may be found by AI core 111 such as by searching knowledge base 114 and/or external resources, including the Internet. A fix may include building firmware and/or software binary code at 316 for any and all associated source code fixes, such as by compiling as previously described herein.

For source code for firmware and/or software in resolution or fix as determined at 316, such firmware and/or software source code may be compiled into corresponding binary code, as previously described, by AI engine 115 of Cloud-based application 110 to generate firmware and/or software binary code respectively. At 311, firmware and/or software binary code generated at 316 may be loaded by AI engine 115 into a virtual machine and/or a simulator, respectively, for simulation, as previously described. Source/binary building loop 323, having evaluation loop 322 nested therein, may be cycled until binary code resolving an error without any side effect is generated, as determined by AI engine 115, at 312.

Because one or more examples described herein may be implemented in an information processing system, a detailed description of examples of each of a network (such as for a Cloud-based SaaS implementation), a computing system, a mobile device, and an MFP is provided. However, it should be understood that other configurations of one or more of these examples may benefit from technology described herein.

Figure 4:
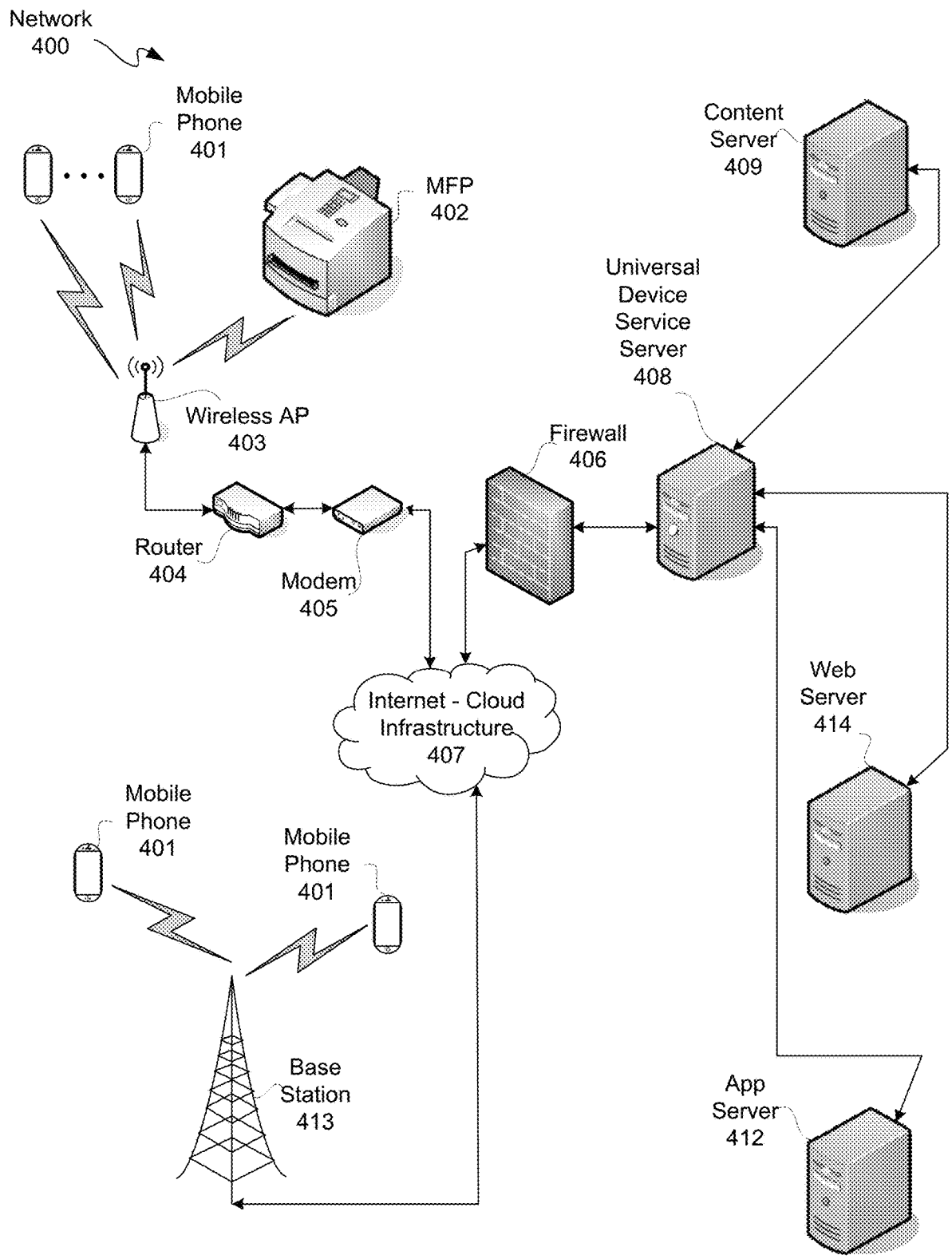
FIG. 4 is a pictorial diagram depicting an example of a network.

FIG. 4 is a pictorial diagram depicting an example of a network 400, which may be used to provide a SaaS platform for hosting a service or micro service for use by a user device, as described herein. Along those lines, network 400 may include one or more mobile phones, pads/tablets, notebooks, and/or other web-usable devices 401 in wired and/or wireless communication with a wired and/or wireless access point ("AP") 403 connected to a wireless router. Furthermore, one or more of such web-usable wireless devices 401 may be in wireless communication with a base station 413. Additionally, a desktop computer and/or a printing device, such as for example a multi-function printer ("MFP") 402, each of which may be web-usable devices, may be in wireless and/or wired communication to and from router 404.

Wireless AP 403 may be connected for communication with a router 404, which in turn may be connected to a modem 405. Modem 405 and base station 413 may be in communication with an Internet-Cloud infrastructure 407, which may include public and/or private networks.

A firewall 406 may be in communication with such an Internet-Cloud infrastructure 407. Firewall 406 may be in communication with a universal device service server 408. Universal device service server 408 may be in communication with a content server 409, a web server 414, and/or an app server 412. App server 412, as well as a network 400, may be used for downloading an app or one or more components thereof for accessing and using a service or a micro service as described herein.

Figure 5:
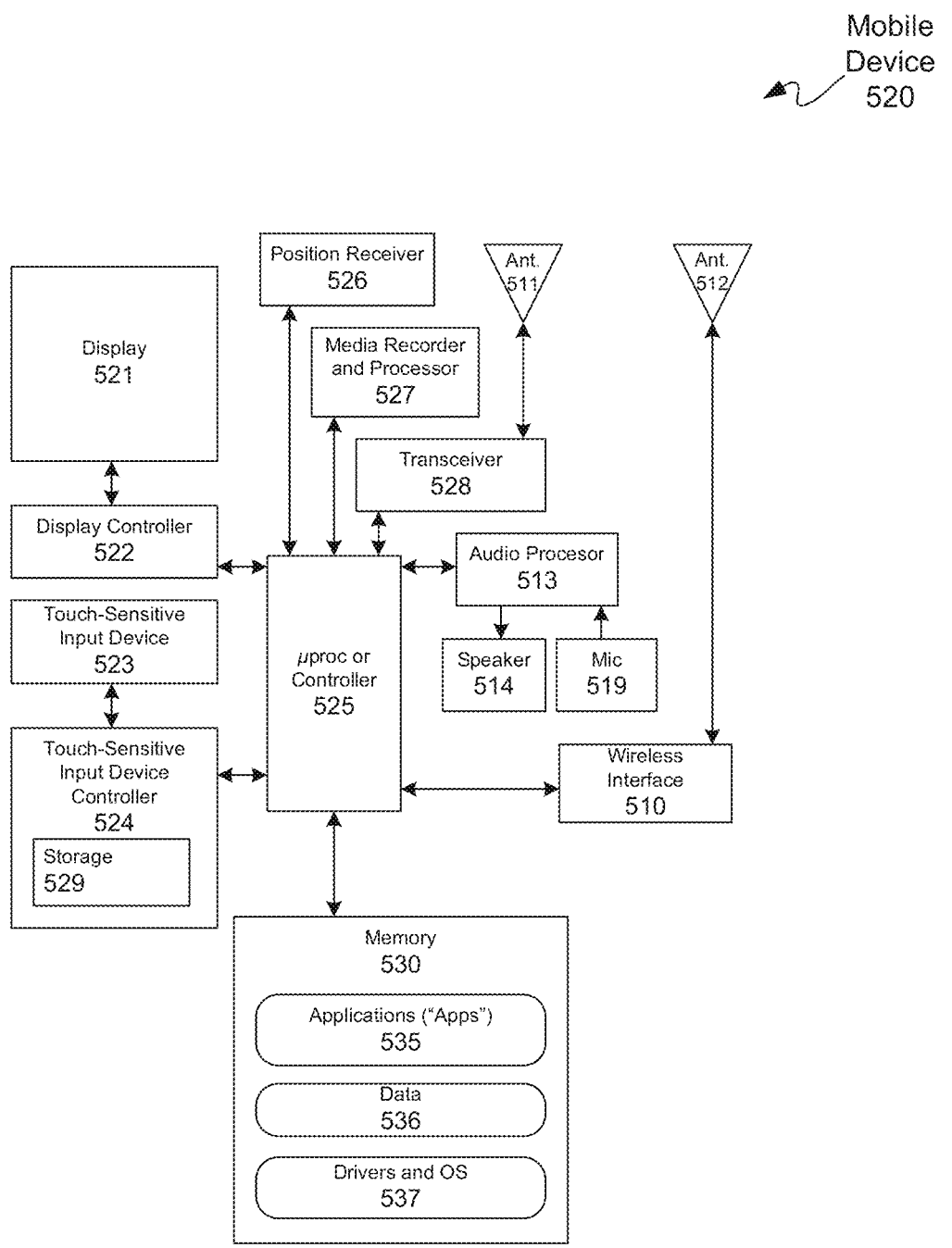
FIG. 5 is block diagram depicting an example of a portable communication device.

FIG. 5 is block diagram depicting an example of a portable communication device ("mobile device") 520. Mobile device 520 may be an example of a mobile device that may be used for communicating with a printing device, as described herein.

Mobile device 520 may include a wireless interface 510, an antenna 511, an antenna 512, an audio processor 513, a speaker 514, and a microphone ("mic") 519, a display 521, a display controller 522, a touch-sensitive input device 523, a touch-sensitive input device controller 524, a microprocessor or microcontroller 525, a position receiver 526, a media recorder and processor 527, a cell transceiver 528, and a memory or memories ("memory") 530.

Microprocessor or microcontroller 525 may be programmed to control overall operation of mobile device 520. Microprocessor or microcontroller 525 may include a commercially available or custom microprocessor or microcontroller.

Memory 530 may be interconnected for communication with microprocessor or microcontroller 525 for storing programs and data used by mobile device 520. Memory 530 generally represents an overall hierarchy of memory devices containing software and data used to implement functions of mobile device 520. Data and programs or apps as described hereinabove may be stored in memory 530.

Memory 530 may include, for example, RAM or other volatile solid-state memory, flash or other non-volatile solid-state memory, a magnetic storage medium such as a hard disk drive, a removable storage media, or other suitable storage means. In addition to handling voice communications, mobile device 520 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 530 stores drivers, such as I/O device drivers, and operating system programs ("OS") 537. Memory 530 stores application programs ("apps") 535 and data 536. Data may include application program data.

I/O device drivers may include software routines accessed through microprocessor or microcontroller 525 or by an OS stored in memory 530. Apps to communicate with devices, such as touch-sensitive input device 523, keys and other user interface objects adaptively displayed on a display 521, may use one or more of such drivers.

Mobile device 520, such as a mobile or cell phone, includes a display 521. Display 521 may be operatively coupled to and controlled by a display controller 522, which may be a suitable microcontroller or microprocessor programmed with a driver for operating display 521.

Touch-sensitive input device 523 may be operatively coupled to and controlled by a touch-sensitive input device controller 524, which may be a suitable microcontroller or microprocessor. Along those lines, touching activity input via touch-sensitive input device 523 may be communicated to touch-sensitive input device controller 524. Touch-sensitive input device controller 524 may optionally include local storage 529.

Touch-sensitive input device controller 524 may be programmed with a driver or application program interface ("API") for apps 535. An app may be associated with a service, as previously described herein, for use of a SaaS. One or more aspects of above-described apps may operate in a foreground or background mode.

Microprocessor or microcontroller 525 may be programmed to interface directly to touch-sensitive input device 523 or through touch-sensitive input device controller 524. Microprocessor or microcontroller 525 may be programmed or otherwise configured to interface with one or more other interface device(s) of mobile device 520. Microprocessor or microcontroller 525 may be interconnected for interfacing with a transmitter/receiver ("transceiver") 528, audio processing circuitry, such as an audio processor 513, and a position receiver 526, such as a global positioning system ("GPS") receiver. An antenna 511 may be coupled to transceiver 528 for bi-directional communication, such as cellular and/or satellite communication.

Mobile device 520 may include a media recorder and processor 527, such as a still camera, a video camera, an audio recorder, or the like, to capture digital pictures, audio and/or video. Microprocessor or microcontroller 525 may be interconnected for interfacing with media recorder and processor 527. Image, audio and/or video files corresponding to pictures, songs and/or videos may be stored in memory 530 as data 536.

Mobile device 520 may include an audio processor 513 for processing audio signals, such as for example audio information transmitted by and received from transceiver 528. Microprocessor or microcontroller 525 may be interconnected for interfacing with audio processor 513. Coupled to audio processor 513 may be one or more speakers 514 and one or more microphones 519, for projecting and receiving sound, including without limitation recording sound, via mobile device 520. Audio data may be passed to audio processor 513 for playback. Audio data may include, for example, audio data from an audio file stored in memory 530 as data 536 and retrieved by microprocessor or microcontroller 525. Audio processor 513 may include buffers, decoders, amplifiers and the like.

Mobile device 520 may include one or more local wireless interfaces 510, such as a WIFI interface, an infrared transceiver, and/or an RF adapter. Wireless interface 510 may provide a Bluetooth adapter, a WLAN adapter, an Ultra-Wideband ("UWB") adapter, and/or the like. Wireless interface 510 may be interconnected to an antenna 512 for communication. As is known, a wireless interface 510 may be used with an accessory, such as for example a hands-free adapter and/or a headset. For example, audible output sound corresponding to audio data may be transferred from mobile device 520 to an adapter, another mobile radio terminal, a computer, or another electronic device. In another example, wireless interface 510 may be for communication within a cellular network or another Wireless Wide-Area Network (WWAN).

Figure 6:
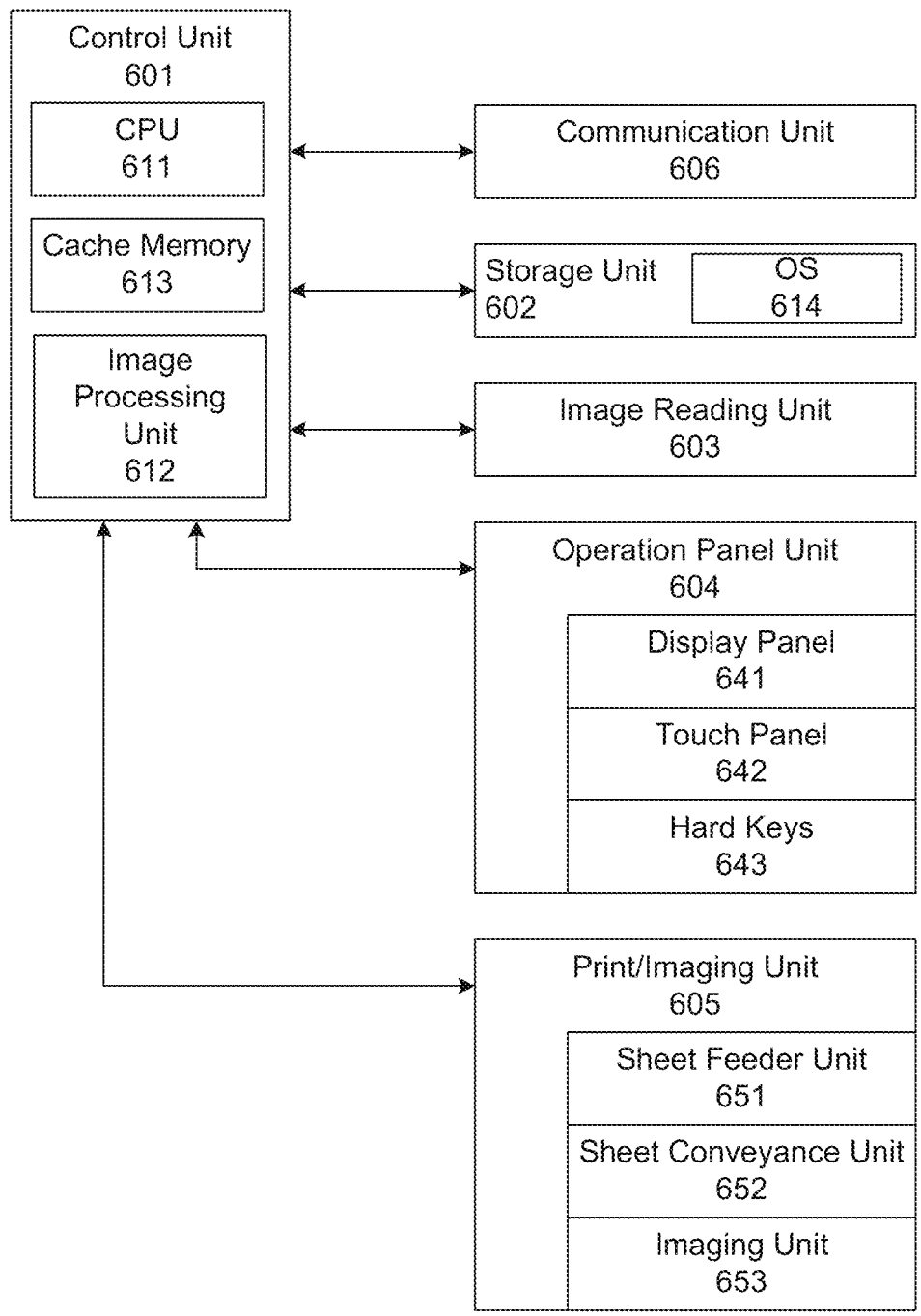
FIG. 6 is a block diagram depicting an example of a multi-function printer (MFP).

FIG. 6 is a block diagram depicting an example of a multi-function printer (MFP) 600. MFP 600 is provided for purposes of clarity by way of non-limiting example. MFP 600 is an example of an information processing system such as for handling a printer job 101 as previously described.

MFP 600 includes a control unit 601, a storage unit 602, an image reading unit 603, an operation panel unit 604, a print/imaging unit 605, and a communication unit 606. Communication unit 606 may be coupled to a network for communication with other peripherals, mobile devices, computers, servers, and/or other electronic devices.

Control unit 601 may include a CPU 611, an image processing unit 612, and cache memory 613. Control unit 601 may be included with, or separate from, other components of MFP 600. Storage unit 602 may include ROM, RAM, and large capacity storage memory, such as for example an HDD or an SSD. Storage unit 602 may store various types of data and control programs, including without limitation an operating system 614 and other software for such MFP 600. A buffer queue may be located in cache memory 613 or storage unit 602. Image processing unit 612 may include a RIP and other firmware of MFP 600.

Operation panel unit 604 may include a display panel 641, a touch panel 642, and hard keys 643. Print/imaging unit 605 may include a sheet feeder unit 651, a sheet conveyance unit 652, and an imaging unit 653.

Generally, for example, for an MFP a copy image processing unit, a scanner image processing unit, and a printer image processing unit may all be coupled to respective direct memory access controllers for communication with a memory controller for communication with a memory. Many known details regarding MFP 600 are not described for purposes of clarity and not limitation.

Figure 7:
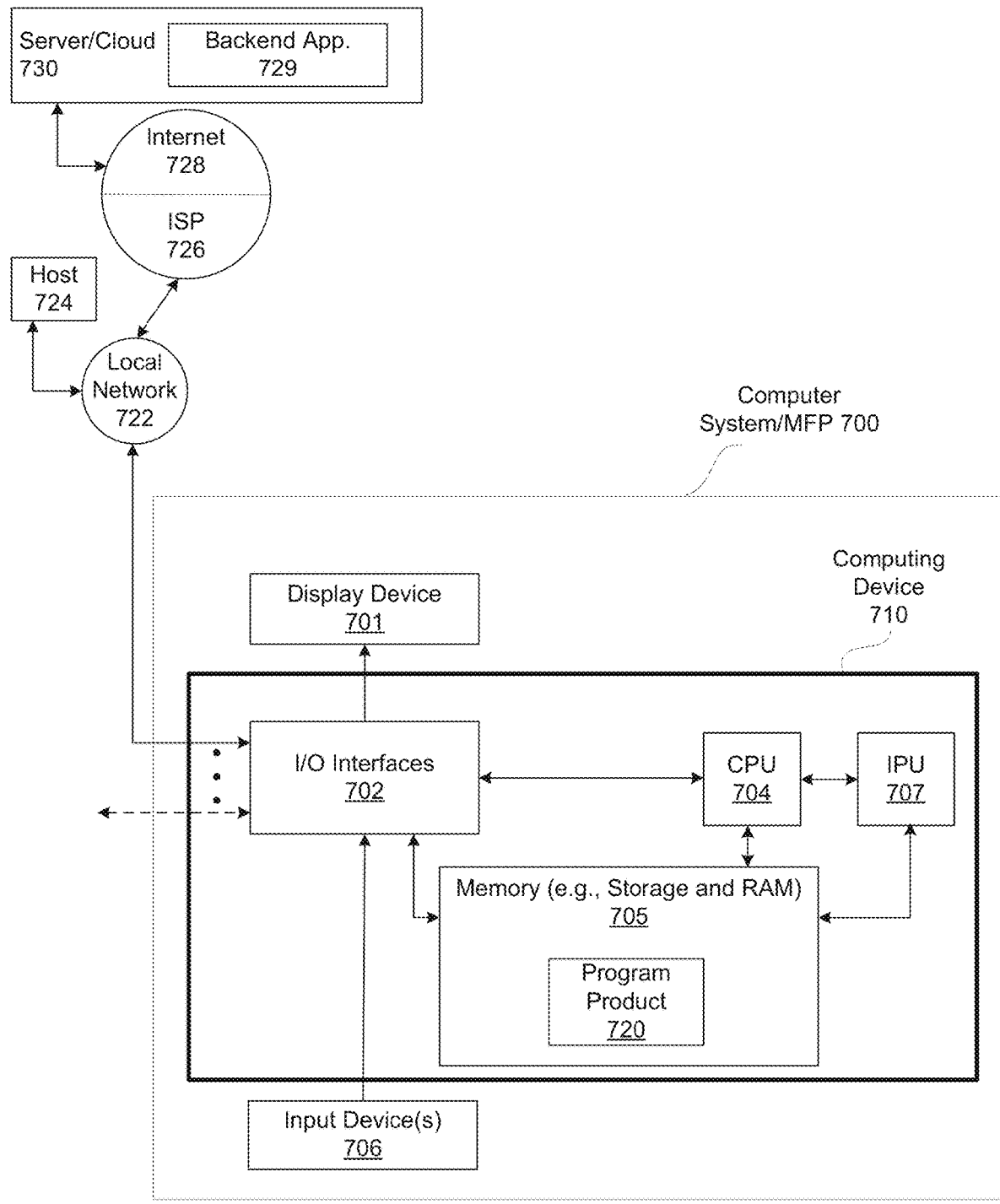
FIG. 7 is a block diagram depicting an example of a computer system.

FIG. 7 is a block diagram depicting an example of a computer system 700 upon which one or more aspects described herein may be implemented. Computer system 700 may include a programmed computing device 710 coupled to one or more display devices 701, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 706, such as a keyboard and a cursor pointing device. Other known configurations of a computer system may be used, and computer system 700 may be implemented as an MFP 700. Computer system 700 by itself or networked with one or more other computer systems 700 may provide an information handling/processing system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, UNIX, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702. Programmed computing device 710 may optionally include an image processing unit ("IPU") 707 coupled to CPU 704 and one or more peripheral cards 709 coupled to I/O interface 702. Along those lines, programmed computing device 710 may include graphics memory 708 coupled to optional IPU 707.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an NVMe-PCIe bus, SATA bus or other bus. Moreover, one or more SSDs may be used, such as for NVMe, RAID or other multiple drive storage for example.

I/O interface 702 may include chip set chips, graphics processors, and/or daughter cards, among other known circuits. In this example, I/O interface 702 may be a Platform Controller Hub ("PCH"). I/O interface 702 may be coupled to a conventional keyboard, network, mouse, camera, microphone, display printer, and interface circuitry adapted to receive and transmit data, such as data files and the like.

Programmed computing device 710 may optionally include one or more peripheral cards 709. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 704 and I/O interface 702. Along those lines, IPU 707 may be incorporated into CPU 704 and/or may be of a separate peripheral card.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide program product 720. Program product 720 may be for implementing portions of process flows, as described herein. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of sequences of instructions contained in main memory may cause CPU 704 to perform one or more process steps described herein. In alternative implementations, hardwired circuitry may be used in place of or in combination with software instructions for such implementations. Thus, example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines, the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load such instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or another Internet service provider. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system 700, are exemplary forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WIFI (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WIFI), and/or a long-range wireless transceiver (e.g., GSM/GPRS, UMTS, CDMA2000, EV-DO, and LTE/LTE-Advanced) can be used depending on the type of communication or the range of the communication.

Computer system 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. A server/Cloud-based system 730 may include a backend application for providing one or more applications or services as described herein. Received code may be executed by processor 704 as it is received, and/or stored in a storage device, or other non-volatile storage, of memory 705 for later execution. In this manner, computer system 700 may obtain application code in form of a carrier wave.

While the foregoing describes exemplary apparatus(es) and/or method(s), other and further examples in accordance with one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method for responding to a system error of a printing device, comprising:
    generating an error code by the printing device in response to the system error;
    reporting the error code associated with printing device to a backend application in a Cloud-based system;
    wherein the backend application includes an artificial intelligence engine for performing operations comprising:
        analyzing the error code;
        checking a knowledge base for a solution to respond to the error code;
        finding the solution in the knowledge base including binary code therefor;
        loading a virtual machine with the binary code;
        simulating operation using the virtual machine with the binary code; and
        evaluating operation of the virtual machine with the binary code;
        wherein the virtual machine simulates operation of an internal engine of the printing device.

2. The method according to claim 1, wherein the analyzing of the error code includes classifying the error code.

3. The method according to claim 1, wherein:
    the printing device is a multi-function printer; and
    the virtual machine is for a multi-function printer engine of the multi-function printer.

4. The method according to claim 1, wherein the binary code is firmware binary code, and wherein the artificial intelligence engine of the backend application is further for performing operations comprising:
    generating software binary code for the solution;
    loading a simulator with the software binary code;
    simulating operation using the simulator with the software binary code; and
    evaluating operation of the simulator with the software binary code;
    wherein the simulator simulates operation of the printing device with the software binary code.

5. The method according to claim 4, wherein the evaluating comprises determining from a simulation result of the simulating with the virtual machine and the simulator a resolution without a side effect.

6. The method according to claim 5, further comprising uploading the firmware binary code and the software binary code to the knowledge base with the error code.

7. A method for responding to a system error of a printing device, comprising:
    generating an error code by the printing device in response to the system error;
    reporting the error code associated with printing device to a backend application in a Cloud-based system;
    wherein the backend application includes an artificial intelligence engine for performing operations comprising:
        analyzing the error code;
        obtaining source code for the printing device;
        upgrading the source code for a solution to the error code;
        generating binary code from the upgraded source code;
        loading a virtual machine with the binary code;
        simulating operation using the virtual machine with the binary code; and
        evaluating operation of the virtual machine with the binary code;
        wherein the virtual machine simulates operation of an internal engine of the printing device.

8. The method according to claim 7, wherein the analyzing of the error code includes classifying the error code.

9. The method according to claim 7, wherein:
    the printing device is a multi-function printer; and
    the virtual machine is for a multi-function printer engine of the multi-function printer.

10. The method according to claim 7, wherein the binary code is firmware binary code, and wherein the artificial intelligence engine of the backend application is further for performing operations comprising:
    generating software binary code for the solution;
    loading a simulator with the software binary code;
    simulating operation using the simulator with the software binary code; and
    evaluating operation of the simulator with the software binary code;
    wherein the simulator simulates operation of the printing device with the software binary code.

11. The method according to claim 10, wherein the evaluating comprises determining from a simulation result of the simulating with the virtual machine and the simulator a resolution without a side effect.

12. The method according to claim 11, further comprising uploading the firmware binary code and the software binary code to a knowledge base with the error code.

13. The method according to claim 11, further comprising:
    checking a knowledge base for the solution to respond to the error code; and
    responsive to not finding the solution in the knowledge base, performing the upgrading of the source code.

14. The method according to claim 13, further comprising uploading the binary code and the source code to the knowledge base with the error code.

15. The method according to claim 7, further comprising:
    checking a knowledge base for the solution to respond to the error code; and
    responsive to not finding the solution in the knowledge base, performing the upgrading of the source code.

16. The method according to claim 15, further comprising uploading the binary code and the source code to the knowledge base with the error code.

17. A method for responding to a system error of a printing device, comprising:
    generating an error code by the printing device in response to the system error;
    reporting the error code associated with printing device to a backend application in a Cloud-based system;
    wherein the backend application includes an artificial intelligence engine for performing operations comprising:
        analyzing the error code;
        obtaining source code for the printing device;
        upgrading the source code for a solution to the error code;

generating binary code from the upgraded source code;
loading a simulator with the binary code;
simulating operation using the simulator with the binary code; and
evaluating operation of the simulator with the binary code;
wherein the simulator simulates operation of an operating system of the printing device.

18. The method according to claim 17, wherein the analyzing of the error code includes classifying the error code.

19. The method according to claim 17, wherein:
the printing device is a multi-function printer; and
the simulator is for the operating system of the multi-function printer.

20. The method according to claim 17, wherein:
the binary code is software binary code; and
the evaluating comprises determining from a simulation result of the simulating with the simulator a resolution without a side effect.

* * * * *